F. F. MARSHEK.
AXLE STEERING KNUCKLE.
APPLICATION FILED DEC. 17, 1912.
1,078,054.
Patented Nov. 11, 1913.
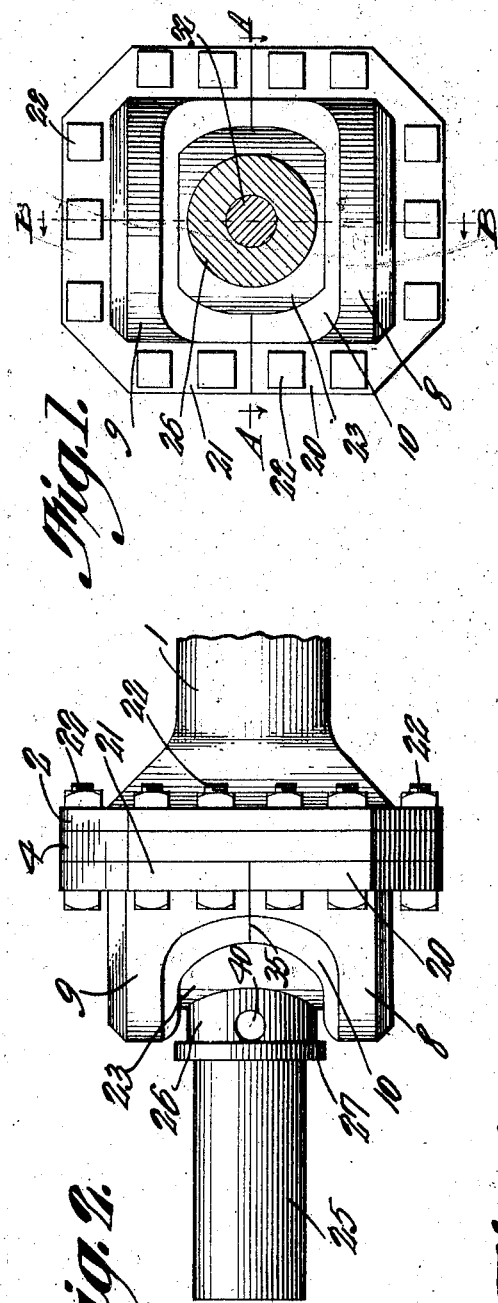
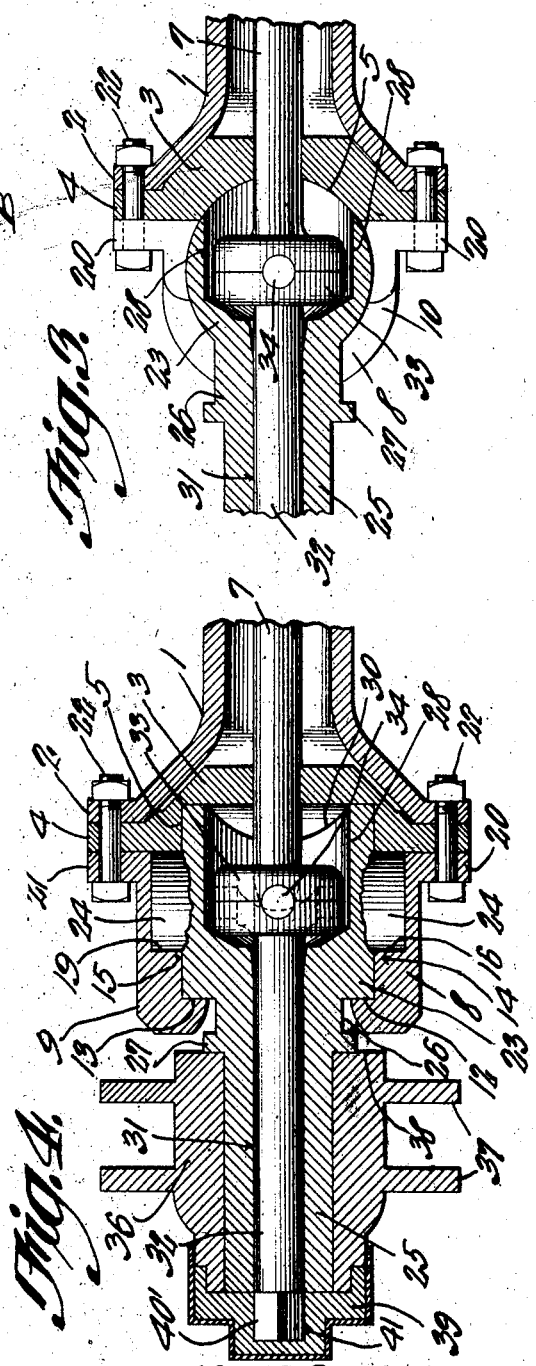
Witnesses
Frank F. Marshek, Inventor
by C. A. Snow & Co., Attorneys

UNITED STATES PATENT OFFICE.

FRANK F. MARSHEK, OF ANTIGO, WISCONSIN.

AXLE STEERING-KNUCKLE.

1,078,054.  Specification of Letters Patent.  Patented Nov. 11, 1913.

Application filed December 17, 1912. Serial No. 737,290.

*To all whom it may concern:*

Be it known that I, FRANK F. MARSHEK, a citizen of the United States, residing at Antigo, in the county of Langlade and State of Wisconsin, have invented a new and useful Axle Steering-Knuckle, of which the following is a specification.

This invention relates to an improved axle steering knuckle which is adapted to transmit power to the front wheels of a vehicle and at the same time provide means whereby the front wheels may be turned as is usual in automobile constructions.

The object is to provide a steering knuckle simple in design, and one which may be readily assembled, and which is composed of a minimum number of parts.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which,—

Figure 1 is a front view in elevation of my improved power transmitting steering knuckle. Fig. 2 is a side view thereof. Fig. 3 is a cross sectional view taken on line A—A of Fig. 1. Fig. 4 is a cross sectional view taken on the line B—B of Fig. 1.

Referring to the drawings in which similar reference numerals designate corresponding parts throughout the several views, 1 is the wheel supporting end of a motor vehicle axle and is provided with the outflaring flange portion 2. The axle is hollow and the flange 2 is of the form of an angular ring preferably octangular as shown in Fig. 1. Only a small portion of the axle 1 has been illustrated, it being understood that suitable means are provided at some point adjacent the end thereof for transmitting power to the shaft 7 which extends therethrough.

In order that the wheel may be mounted so that it may turn for the proper steering of the vehicle and in order that suitable means may be provided for transmitting power thereto, the spindle 25 is provided at its inner end with a vertical axle 23 with the trunnions 24 formed integral therewith. A casing for the cylindrical axle 23 and trunnions 24 is provided and consists of the rear or inner member 3 which is provided with the outlying flange 4 similar in outline to the flange 2 of the axle 1. A portion of this back casing plate 3 is cut away as at 5, the outline of the wall of the removed portion thereof being an arc of a circle of diameter equal to the vertical cylindrical axle 23. The front and retaining portion of the casing or journal box is composed of the sections 8 and 9, the line 35 as illustrated in Fig. 2 being the meeting edge of these two sections. The section 8 of the casing is cut away as at 10 which allows for a suitable movement of the spindle during the steering of the wheel. This casing is cylindrically bored as at 12 and as at 16, there being a shoulder 14 therebetween for engagement with the end of the axle 23. The casing section 9 is formed similar to that of section 8 and is provided with the cylindrical bores 13 and 19 with the shoulder 15 lying therebetween. The sections 8 and 9 are formed at their inner ends with the outlying flanges 20 and 21 respectively which are similar in outline to the aforementioned flanges 2 and 4, all three of which flanges are provided with suitable bolt openings therethrough through which extend the retaining bolts 22, the function of these bolts being to hold the sections of the casing to the back plate thereof and to securely support the entire casing to and upon the vehicle axle 1.

From the foregoing it will be seen that when the various sections are assembled as illustrated in Fig. 2 they form a suitable journal box for the support and holding of the axle 23 and the trunnions 24 which are formed integral therewith.

The cylindrical axle 23 which is positioned with its axis vertical while in use has the trunnions 24 concentric therewith and is provided or formed with the cylindrical bore 28 extending therein. The cylindrical bore 28 is of a sufficient diameter to accommodate a universal joint therein which universal is of size sufficient to transmit power from a suitable source to the vehicle wheel. The line 30 represents the intersection of the bore with the cylindrical surface of the axle and the opening formed in the said axle is sufficient to allow the spindle to turn about the trunnions for a suitable steering position, the limit of this rotation being, as is apparent from Fig. 3, when the outer wall of the opening 28 contacts with the shaft 7 communicating with the universal joint.

A spindle 25 is formed integral with the axle 23 and extends radially therefrom, it being noted in this connection that the cylindrical axle 23, trunnions 24, and the spindle 25 are formed integral and constitute what is termed as the axle-trunnion-spindle member. The spindle is formed with a suitable raised portion 26 and a shoulder 27 adjacent thereto. The shoulder 27 holds the vehicle wheel in proper position thereon. An opening 40 is formed in the raised portion 26 of the spindle and is suitably threaded in order to be engaged by a suitable rod connection between the spindle and a steering gear, the object of said rod being to provide suitable means whereby the spindle may be suitably turned for the steering of the vehicle. In order that the power may be transmitted to the front wheels a suitable opening is journaled in the casing plate 3 through which extends the shaft 7 which is connected to the universal joint 33 by means of suitable bearing pins or pivots 34, it being understood in this connection that the bearing pins 34 lie substantially and rotate in a plane which extends through the axis of the cylindrical axle 23 and trunnions 24, this insuring that the spindle may properly turn about the trunnions 24 and the universal joint will accommodate said turning. The spindle 25 is provided with an opening formed therein which extends through the axle 23 and may be considered a continuation of the bore 28. Mounted within the opening in the spindle is the shaft 32 connected at its inner end to the universal joint and having its outer end provided with a squared portion 40′ which fits within and is adapted to rotate a cap 39 provided with a square aperture 41 therein. The said cap 39 is positioned upon and held in engagement with a wheel 36 of which the hub only has been illustrated. The projections 37 radiating therefrom represent the flange members to which the spokes of the wheel are bolted. The inner surface of the wheel as at 38, lines in contact with and is held against the shoulder 27 which thereby holds the wheel in position upon the said spindle.

Although no means have been illustrated for preventing the wheel from sliding off of the spindle, it is to be understood in this connection that any of the usual means may be employed, it being understood that a wheel hub has been illustrated only for the purpose of showing the manner in which the power may be transmitted thereto.

The construction of the wheel hub and in fact the outer surface of the spindle is not a part of my invention and may be of the usual construction.

The advantage of the construction herein set forth will be readily apparent to those skilled in the art and may be briefly summed up as follows:—The spindle, axle and trunnions are formed integral, are made from a single forging and are cylindrical in outline and therefore may be readily turned. The bore extending within the axle, (it being understood in this connection that the word "axle" refers to the member 23, the vehicle axle 1 when referred to will be spoken of as the vehicle axle) is cylindrical in outline and concentric with the cylindrical bore 31 extending within the spindle. The casing contacts with the axle as well as with the trunnions and therefore insures an extending bearing surface therewith. The casing being formed of a rear plate and the two removable sections fastened thereto, allows the entire construction to be readily taken apart or assembled so that the entire steering axle knuckle may be retained in an operative condition. The casing being formed with the outlying flanges allows the vehicle axle 1 to be flanged at its ends which construction allows the axle to be reinforced and to thereby successfully stand the strain at the point upon which the most strain occurs.

Having thus fully disclosed the construction and pointed out the advantages of my improved construction what I claim to be new and original with me is:—

1. In a power transmitting steering knuckle, the combination of a housing comprising a back plate and two front members, said housing forming a central journal box with relatively smaller journal boxes at the ends thereof; an axle-trunnion-spindle member journaled within said housing and adapted to rotate about the axis of the axle and the trunnions, said member being provided with a bore extending transversely of said axle and communicating with a longitudinal bore in said spindle, a shaft within said axial bore, a shaft within said spindle bore and connected to the aforementioned shaft by a universal joint.

2. In a power transmitting steering knuckle the combination of, a housing formed with a back plate formed with an outstanding flange, front housing members formed with cylindrical bores therein and having flanges outstanding therefrom, adapted to be held to said plate flange, an axle journaled within said housing and adapted to turn about its longitudinal axis, trunnions formed concentric with and at the ends of said axle, a spindle positioned centrally and extending radially from said axle, said spindle provided with a longitudinal bore communicating with a relatively larger bore provided transversely of said axle.

3. In a power transmitting steering knuckle, a housing formed with a back plate and with an outstanding flange, front housing members formed with a cylindrical bore therein and formed with an outstanding flange adapted to be held to said plate flange, an axle journaled within said housing and adapted to turn about its longitudinal axis, trunnions formed concentric with and at the ends of said axle, a spindle positioned centrally and extending radially from said axle, said spindle being provided with a longitudinal bore communicating with a relatively larger bore provided transversely of said axle, a shaft extending through said back housing plate, a shaft journaled within said spindle longitudinal bore, said shafts being connected by a universal joint.

In testimony that I claim the foregoing as my own, I have hereto affixed my signature in the presence of two witnesses.

FRANK F. MARSHEK.

Witnesses:
 OTTO P. WALCH,
 MAY ROBINSON.